US010081575B2

(12) United States Patent
Lin et al.

(10) Patent No.: US 10,081,575 B2
(45) Date of Patent: Sep. 25, 2018

(54) SINTERED CERAMIC COMPONENT AND A PROCESS OF FORMING THE SAME

(71) Applicants: SAINT-GOBAIN CERAMICS & PLASTICS, INC., Worcester, MA (US); SAINT-GOBAIN CENTRE DE RECHERCHES ET D'ETUDES EUROPÉEN, Courbevoie (FR)

(72) Inventors: Guangyong Lin, Shrewsbury, MA (US); Yeshwanth Narendar, Westford, MA (US); Brian C. LaCourse, Pepperell, MA (US); Wesley R. Robbins, East Brookfield, MA (US); Daniel René Urffer, Saint-Saturnin les Avignon (FR)

(73) Assignees: SAINT-GOBAIN CERAMICS & PLASTICS, INC., Worcester, MA (US); SAINT-GOBAIN CENTRE DE RECHERCHE ET D'ETUDES EUROPÉEN, Courbevoie (FR)

( * ) Notice: Subject to any disclaimer, the term of this patent is extended or adjusted under 35 U.S.C. 154(b) by 0 days.

(21) Appl. No.: 15/466,321

(22) Filed: Mar. 22, 2017

(65) Prior Publication Data
US 2017/0190624 A1 Jul. 6, 2017

Related U.S. Application Data

(62) Division of application No. 14/928,526, filed on Oct. 30, 2015.
(Continued)

(51) Int. Cl.
*C04B 35/443* (2006.01)
*C04B 35/04* (2006.01)
(Continued)

(52) U.S. Cl.
CPC ............ *C04B 35/04* (2013.01); *C04B 35/053* (2013.01); *C04B 35/443* (2013.01); *C04B 35/63* (2013.01);
(Continued)

(58) Field of Classification Search
CPC ..... C04B 35/443; C04B 35/04; C04B 35/043; C04B 35/0435
See application file for complete search history.

(56) References Cited

U.S. PATENT DOCUMENTS 4,107,255 A * 8/1978 Clishem ................. C04B 35/05
264/299
4,678,761 A 7/1987 Virkar et al.
(Continued)

FOREIGN PATENT DOCUMENTS

JP 60081058 * 5/1985
JP H06227856 A 8/1994
(Continued)

OTHER PUBLICATIONS

Petric, Anthony et al., "Electrical Conductivity and Thermal Expansion of Spinels at Elevated Temperatures," Journal of the American Ceramic Society, dated 2007, pp. 1515-1520, vol. 90. No. 5, US.
(Continued)

*Primary Examiner* — Karl E Group
(74) *Attorney, Agent, or Firm* — Abel Law Group, LLP; Thomas Osborn

(57) ABSTRACT

A sintered ceramic component can have a final composition including at least 50 wt. % MgO and at least one desired dopant, wherein each dopant of the at least one desired dopant has a desired dopant content of at least 0.1 wt. %. All impurities (not including the desired dopant(s)) are present at a combined impurity content of less than 0.7 wt. %. A remainder can include $Al_2O_3$. The selection of dopants can
(Continued)

allow for better control over the visual appearance of the sintered ceramic component, reduces the presence of undesired impurities that may adversely affect another part of an apparatus, or both. The addition of the dopant(s) can help to improve the sintering characteristics and density as compared to a sintered ceramic component that includes the material with no dopant and a relatively low impurity content.

20 Claims, 5 Drawing Sheets

Related U.S. Application Data

(60) Provisional application No. 62/077,583, filed on Nov. 10, 2014.

(51) Int. Cl.

| | |
|---|---|
| *H01M 8/2485* | (2016.01) |
| *H01M 8/1246* | (2016.01) |
| *C04B 35/053* | (2006.01) |
| *C04B 35/64* | (2006.01) |
| *H01M 8/2484* | (2016.01) |
| *H01M 8/2483* | (2016.01) |
| *C04B 35/63* | (2006.01) |
| *H01M 8/124* | (2016.01) |

(52) U.S. Cl.
CPC ........... *C04B 35/64* (2013.01); *H01M 8/1246* (2013.01); *H01M 8/2483* (2016.02); *H01M 8/2484* (2016.02); *H01M 8/2485* (2013.01); *C04B 2235/3206* (2013.01); *C04B 2235/3208* (2013.01); *C04B 2235/3217* (2013.01); *C04B 2235/3222* (2013.01); *C04B 2235/3225* (2013.01); *C04B 2235/3232* (2013.01); *C04B 2235/3236* (2013.01); *C04B 2235/5436* (2013.01); *C04B 2235/5463* (2013.01); *C04B 2235/602* (2013.01); *C04B 2235/72* (2013.01); *C04B 2235/77* (2013.01); *C04B 2235/9607* (2013.01); *C04B 2235/9661* (2013.01); *H01M 2008/1293* (2013.01)

(56) References Cited

U.S. PATENT DOCUMENTS

| | | | |
|---|---|---|---|
| 5,153,153 | A | 10/1992 | Freudenberg et al. |
| 6,455,453 | B1 * | 9/2002 | Chikagawa .............. C03C 8/14 257/E23.009 |
| 6,610,623 | B1 | 8/2003 | Alford et al. |
| 6,723,442 | B1 | 4/2004 | Decker et al. |
| 6,998,064 | B2 | 2/2006 | Gadow et al. |
| 7,550,221 | B2 | 6/2009 | Crumm et al. |
| 9,079,800 | B2 | 7/2015 | Tsutsumi et al. |
| 2003/0146151 | A1 | 8/2003 | Chi et al. |
| 2004/0102309 | A1 | 5/2004 | Gadow et al. |
| 2010/0233497 | A1 | 9/2010 | Thimm et al. |
| 2013/0299749 | A1 | 11/2013 | Tsutsumi et al. |

FOREIGN PATENT DOCUMENTS

| | | |
|---|---|---|
| JP | H1192212 A | 4/1999 |
| JP | 2001114554 A | 4/2001 |
| JP | 2010524816 A | 7/2010 |

OTHER PUBLICATIONS

Singhal, S.C. et al., "Electrical and Thermal Properties of Spinels," Solid Oxide Fuel Cells IX (SOFC-IX), Proceedings of the International Symposium, dated 2005, pp. 1866-1873, vol. 2, Materials.
Xu, Ruren et al., "Transparent Ceramics," Modern Inorganic Synthetic Chemistry, Elsevier, dated 2011, p. 445.
International Search Report and Written Opinion for PCT Application No. PCT/US2015/058346, dated Feb. 3, 2016, 12 pages.

* cited by examiner

SINTERED CERAMIC COMPONENT AND A PROCESS OF FORMING THE SAME

CROSS-REFERENCE TO RELATED APPLICATIONS

The present application is a divisional application of and claims priority to U.S. patent application Ser. No. 14/928,526, filed Oct. 30, 2015, now abandoned, entitled "Sintered Ceramic Component and a Process of Forming the Same", naming as inventors Guangyong Lin et al., which claims priority to U.S. Provisional Patent Application No. 62/077,583, filed Nov. 10, 2014, entitled "Sintered Ceramic Component and a Process of Forming the Same", naming as inventors Guangyong Lin et al., both of which applications are incorporated by reference herein in its entirety.

FIELD OF THE DISCLOSURE

The following is directed to sintered ceramic components and processes of forming the same.

DESCRIPTION OF RELATED ART

Manifolds for solid oxide fuel cells can be made of magnesia-magnesium aluminate spinel ceramics. The starting materials for the ceramics may be commercial grade materials that include impurities that may provide undesired colors for the manifold or potentially may contaminate other components within a solid oxide fuel cell. Improvements in manifold compositions are desired.

BRIEF DESCRIPTION OF THE DRAWINGS

Embodiments are illustrated by way of example and are not limited by the accompanying figures.

Figure 1:
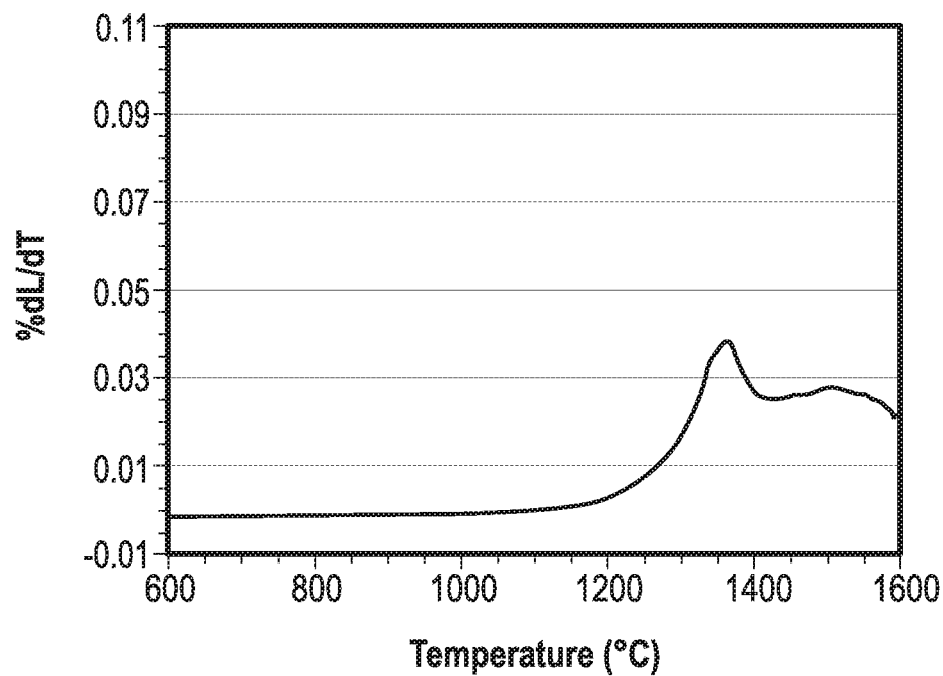
FIG. 1 includes a dilatometry curve for a comparative sample with a relatively high level of impurities.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, color space coordinates are expressed in terms of CIE 1976 (CIELAB) coordinates, L*, a*, and b*.

The term "dopant" is intended to mean a compound that is intentionally added to affect a property of a material to which such compound is added.

Group numbers corresponding to columns within the Periodic Table of Elements are based on the IUPAC Periodic Table of Elements, version dated Jan. 21, 2011.

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the solid oxide fuel cell and ceramic arts.

An apparatus can include a sintered ceramic component. The apparatus can be an energy generating apparatus that includes one or solid oxide fuel cells or can be a gas-to-liquid membrane system. In an embodiment, the sintered ceramic component can be a manifold to provide a gas to or remove a gas from the apparatus or can be another component that is used in conjunction with the solid oxide fuel cell(s) or gas-to-liquid membrane system. Such other component may be used to connect a plurality of solid oxide fuel cells or systems to each other.

The sintered ceramic component may include a high purity magnesia magnesium aluminate ("MMA") that is intentionally doped with one or more impurities to provide good sintering properties, high density, a particular color, if needed or desired, and not have other impurities that could adversely affect the color or adversely interact with other components in the apparatus.

In a particular embodiment, the sintered ceramic component can include at least 50 wt. % MgO; at least one desired dopant, wherein each dopant of the at least one desired dopant has a desired dopant content of at least 0.1 wt. %; all impurities are present at a combined impurity content of less than 0.7 wt. %; and a remainder comprising $Al_2O_3$.

In an embodiment desired dopant can include CaO, $Y_2O_3$, $TiO_2$, another suitable dopant, or any combination thereof. In another embodiment, the desired dopant can include SrO, BaO, $Sc_2O_3$, $La_2O_3$, $ZrO_2$, $HfO_2$, $V_2O_5$, $Nb_2O_5$, $Ta_2O_5$, $Mo_2O_3$, $W_2O_3$, $Co_2O_3$, or any combination thereof. $Fe_2O_3$ may be useful as a co-dopant when combined with another dopant, such as CaO. In an embodiment, the desired dopant content is at least 0.2 wt. %, at least 0.3 wt. %, at least 0.4 wt. %, or at least 0.5 wt. %, and in another embodiment, the desired dopant content is no greater than 5 wt. %, no greater than 3 wt. %, no greater than 2 wt. %, or no greater than 1.1 wt. %. In a particular embodiment, the desired dopant content is in a range of 0.2 wt. % to 5 wt. %, 0.3 wt. % to 3 wt. %, 0.4 wt. % to 2 wt. %, or 0.5 wt. % to 1.1 wt. %.

The desire dopant concentrations may be tailored more closely to particular dopants. For CaO, the CaO content can be at least 0.2 wt. %, at least 0.3 wt. %, at least 0.4 wt. %, or at least 0.5 wt. %, or may be no greater than 3 wt. %, no greater than 2 wt. %, no greater than 1.5 wt. %, or no greater than 0.95 wt. %. In a particular embodiment having CaO, the CaO content is in a range of 0.2 wt. % to 3 wt. %, 0.3 wt. % to 2 wt. %, 0.4 wt. % to 1.5 wt. %, 0.5 wt. % to 0.95 wt. %, or 0.2 wt. % to 0.5 wt. %. For $Y_2O_3$, the $Y_2O_3$ content can be at least 0.2 wt. %, at least 0.3 wt. %, at least 0.4 wt. %, or at least 0.5 wt. %, or may be no greater than 3 wt. %, no greater than 2 wt. %, no greater than 1.5 wt. %, or no greater than 0.95 wt. %. In a particular embodiment having $Y_2O_3$, the $Y_2O_3$ content is in a range of 0.2 wt. % to 3 wt. %, 0.3 wt. % to 2 wt. %, 0.4 wt. % to 1.5 wt. %, or 0.5 wt. % to 0.95 wt. %. For $TiO_2$, the $TiO_2$ content can be at least 0.2 wt. %, at least 0.3 wt. %, at least 0.4 wt. %, or at least 0.5 wt. %, or may be no greater than 3 wt. %, no greater than 2.5 wt. %, no greater than 2.0 wt. %, or no greater than 1.5 wt. %. In a particular embodiment having $TiO_2$, the $TiO_2$ content is in a range of 0.2 wt. % to 3 wt. %, 0.3 wt. % to 2.5 wt. %, 0.4 wt. % to 2.0 wt. %, or 0.5 wt. % to 1.5 wt. %.

In a particular embodiment, some compounds may not be desired dopants. For example, the desired dopant may not include $Cr_2O_3$, NiO, CuO, or any combination thereof. Such compounds may react with MgO or $Al_2O_3$ to form a different compound.

The ceramic material may be co-doped with a first dopant and a second dopant that is different from the first dopant. The first dopant can include CaO, $Y_2O_3$, or $TiO_2$, and the second dopant includes CaO, $Y_2O_3$, $TiO_2$, $Fe_2O_3$, SrO, BaO, $Sc_2O_3$, $La_2O_3$, $ZrO_2$, $HfO_2$, $V_2O_5$, $Nb_2O_5$, $Ta_2O_5$, $Mo_2O_3$, $W_2O_3$, $Co_2O_3$, or any combination thereof. In an embodiment, the first dopant is present in the final composition at a higher concentration than the second dopant, and in another embodiment, the first dopant is present in the final composition at a lower concentration than the second dopant. In a particular embodiment, a combination of the first and second dopants is in a range of 1 wt. % to 9 wt. % of the final composition.

Most of the sintered ceramic component may include magnesia and alumina. In an embodiment, the composition of the sintered ceramic component can be selected to achieve a coefficient of thermal expansion (CTE) to match another component to which the sintered ceramic component may be coupled. CTEs as described herein are the CTEs as measured from 25° C. to 1200° C. In conjunction with the annealing conditions disclosed above, the CTE can be at least 9.0 ppm/° C., such as at least 10.3 ppm/° C. or at least 10.6 ppm/° C. In another embodiment, the sintered ceramic component may have a CTE of no greater than 13.0 ppm/° C., such as no greater than 12.7 ppm/° C., or no greater than 12.5 ppm/° C. In yet another embodiment, the sintered ceramic component can have a CTE in a range of 9.0 ppm/° C. to 13.0 ppm/° C., 10.3 ppm/° C. to 12.7 ppm/° C., or 10.6 ppm/° C. to 12.5 ppm/° C. Depending on the applications of the sintered ceramic component, the CTE of the sintered ceramic component can match closely to that of the material to be coupled. For example, the sintered having a CTE in a range of 11.0 ppm/° C. to 12.5 ppm/° C. is well suited for use with an SOFC. In another embodiment, the sintered ceramic component having a CTE of 10.6 ppm/° C. to 12.5 ppm/° C. can be suitable for use with a gas-to-liquid membrane system.

In another embodiment, the content may be expressed as an amount of MgO and another amount of $Al_2O_3$. In an embodiment, the MgO has a content that is at least 51 wt. %, at least 55 wt. %, or at least 60 wt. %, and in another embodiment, the MgO has a content that is no greater than 80 wt. %, no greater than 75 wt. %, or no greater than 70 wt. %. In a particular embodiment, the MgO has a content that is in a range of 51 wt. % to 80 wt. %, 55 wt. % to 75 wt. %, 60 wt. % to 70 wt. %. In an embodiment the $Al_2O_3$ has a content that is at least 20 wt. %, at least 25 wt. %, or at least 30 wt. %, and in another embodiment, the $Al_2O_3$ has a content that is no greater than 49 wt. %, no greater than 45 wt. %, or no greater than 40 wt. %. In a particular embodiment, the $Al_2O_3$ has a content that is in a range of 20 wt. % to 49 wt. %, 25 wt. % to 45 wt. %, 30 wt. % to 40 wt. %.

The desired dopants may help to achieve good density without having to sinter the ceramic component at too high of a temperature or having relatively high levels of undesired impurities. In an embodiment, the sintered ceramic component has a density that is at least 90% of theoretical density, at least 92% of theoretical density, or at least 94% of theoretical density, and in another embodiment, no greater than 99.9% of theoretical density, no greater than 99.5% of theoretical density, or no greater than 99.0% of theoretical density. In a particular embodiment, the sintered ceramic component has a density in a range of 90% to 99.9% of theoretical density, 92% to 99.5% of theoretical density, or 94% to 99% of theoretical density.

Density may also be expressed on a relative basis. The relative densities can be expressed as a difference in percentages of theoretical density. As an example, two different components have different compositions and are sintered under the same conditions. One of the components may have a density that is 97% of theoretical density, and the other component may have a density that is 92% of theoretical density. The density of the one component is 5% higher than the density of the other component. In an embodiment, when sintered under the same conditions, the sintered ceramic component has a density that is at least 3%, at least 6%, at least 9%, or at least 12% higher than a density of a different sintered ceramic component that includes at least 50 wt. % MgO, all impurities are present at a combined impurity content of less than 0.7 wt. %, a remainder comprising $Al_2O_3$, and other than MgO and $Al_2O_3$, no other metal oxide is present at a content of at least 0.1 wt. %. In another embodiment, when sintered under the same conditions, the sintered ceramic component has a density that is no greater that 17%, no greater than 16%, no greater than 15%, or no greater than 14% higher than a density of a different sintered ceramic component that includes at least 50 wt. % MgO, all impurities are present at a combined impurity content of less than 0.7 wt. %, a remainder comprising $Al_2O_3$, and other than MgO and $Al_2O_3$, no other metal oxide is present at a content of at least 0.1 wt. %. In a particular embodiment, when sintered under the same conditions, the sintered ceramic component has a density that is in a range of 3% to 17%, 6% to 16%, 9% to 15% higher than a density of a different sintered ceramic component that includes at least 50 wt. % MgO, all impurities are present at a combined impurity content of less than 0.7 wt. %, a remainder comprising $Al_2O_3$, and, other than MgO and $Al_2O_3$, other metal oxide is present at a content of at least 0.1 wt. %.

The color of the sintered ceramic component can be expressed in CIELAB coordinates. In an embodiment, the sintered ceramic component has L* is at least 65, at least 80, or at least 88; a* is in a range of −1.0 to +7.0, −0.3 to +2.0, or −0.2 to +1.5; and b* is in a range of +4.0 to +20, +4.2 to +15, or +4.4 to +12. A user of the sintered ceramic component may desire that the sintered ceramic component have a relatively white appearance. In an embodiment, the sintered ceramic component has L* is at least 85, at least 88, or at least 89; a* is in a range of −1.0 to +1.0, −0.3 to +0.7, or −0.2 to +0.4; and b* is in a range of +4.0 to +9.0 +4.2 to +8.5, or +4.4 to +8.0. Contamination, rather than color, may more of a concern. Alternatively, a user may desire that the sintered ceramic component have a yellow or dark yellow appearance. In a particular embodiment, the sintered ceramic component has L* is at least 65, at least 70, or at least 75; a* is in a range of 0.0 to +7.0 +0.5 to +6.6 or +0.7 to +6.0; and b* is in a range of +5.0 to +20, +6.0 to +17, or +6.5 to +15.

A process of forming the sintered ceramic compound can include obtaining appropriate powders that make up the sintered ceramic compound. Sources for the MgO and $Al_2O_3$ may include those particular compounds or can include other sources. In an embodiment, powders of MgO and spinel ($MgAl_2O_4$) may be used. In another embodiment, a powder including a fused MgO-containing $MgAl_2O_4$ may be used. Thus, the relative amounts of MgO and $Al_2O_3$ may be controlled in a variety of ways. One or more desired dopants can be added. Any of the dopants previously described may be added at the amounts previously described. In another embodiment, the dopants may be added using a different compound. For example, $CaCO_3$ may be used instead of or in conjunction with CaO. During the formation sequence, $CaCO_3$ decomposes into CaO and $CO_2$, thus, leaving CaO in the sintered ceramic component. The amount of $CaCO_3$ in the starting material may be adjusted to account for a higher molecular weight as compared to CaO. The powders may be agglomerated, milled, subjected to another particle size changing operation, or the like, if needed or desired. In an embodiment, the powders may have different particle sizes for the same material or different materials. The powders for the ceramic component can be combined before, during or after the powders have an appropriate particle size. The powders can include at least 50 wt. % MgO; at least one desired dopant, wherein each dopant of the at least one desired dopant has a desired dopant content of at least 0.1 wt. %; all impurities are present at a combined impurity content of less than 0.7 wt. %; and a remainder comprising $Al_2O_3$.

The process can further include combining the powders and a binder, another material, or a combination thereof to form a green mixture. The binder or other material can include a polyacrylate, a polyvinyl alcohol, a polyethylene glycol, another suitable material to aid in mixing or binding the powders, or any combination thereof. A solvent can be used if needed or desired. The solvent can include water, alcohol, glycol, another suitable liquid that can aid in allow for better mixing of the powders and the binder, or any combination thereof. One or more additional materials can be added if needed or desire. Such additional materials can include a surfactant, a polyvinyl alcohol, a polyvinyl butyral, a butyl benzyl phthalate, a fish oil, or any combination thereof.

The method can further include shaping the green mixture having a shape corresponding to the sintered ceramic component. The shape can be larger than the final sintered ceramic component due to densification during a subsequent sintering operation.

The object can be heated during one or more operations to form the sintered ceramic component. The object may be heated to a first temperature to drive out volatile components, such as the solvent. The temperature can be in a range of 25° C. to 150° C. for a time in a range of 1 hour to 4 hours. The pressure during volatile component drive off can be at atmospheric pressure or under vacuum pressure. If vacuum pressure is used, the pressure should not be so low as to cause any cracks, fractures, or other defects to form in the object. The temperature can be increased to burn out the binder and any other carbon-containing material. The temperature for the burn out operation can be in a range of 150° C. to 650° C. for a time in a range of 5 to 48 hours. The pressure for the burn out can be performed at atmospheric pressure, at a higher pressure than atmospheric pressure, or under vacuum. Gas evolved during burn out may be difficult to remove if the pressure is too higher. In an embodiment, the pressure may not be greater than 30 kPa. If the pressure is too low, cracks, fractures, or other defects may form in the object. In an embodiment, the pressure may be at least 0.2 kPa-abs. In another embodiment, pressures higher or lower than recited may be used. The burn out can be performed using an oxygen-containing gas, such as $O_2$, ozone, $N_2O$, NO, or the like. $O_2$ may be in the form of air (21 vol. % $O_2$) or may be provided at a concentration different from air. Air may be flown into the furnace during the burn out of the binder or other carbon-containing material.

The temperature can be further increased to form the sintered ceramic component. The one or more dopants in the object can help to lower the sintering temperature of the material. Thus, the sintering can be performed lower than the magnesia-alumina material by itself. The sintering can be performed at a temperature less than 1600° C. Without dopant, the magnesia-alumina material will not properly sintered until the material is well above 1600° C., such as closer to 1800° C. In an embodiment, sintering is performed at a temperature of at least 1200° C., at least 1250° C., or at least 1300° C., and in another embodiment, sintering is performed at a temperature no greater than 1575° C., no greater than 1500° C., or no greater than 1450° C. In a particular embodiment, sintering is performed at a temperature in a range of 1200° C. to 1575° C., 1250° C. to 1550° C., or 1300° C. to 1450° C. The sintering may be performed for a time to allow sufficient sintering and densification to occur. In an embodiment, the time is at least 1 hour, at least 2 hours, or at least 3 hours, and in another embodiment, the time may be no greater than 50 hours, no greater than 20 hours, or no greater than 9 hours. In a particular embodiment, the time is in a range of 1 hour to 50 hours, 2 hours to 20 hours, or 3 hours to 9 hours. Sintering can be performed at a pressure of at least atmospheric pressure (also referred to as pressureless sintering) to a relatively high pressure. The pressure can be applied in the form of pressurized gas, hot pressing or hot isostatic pressing. Sintering can be performed using an oxygen-containing gas, such as $O_2$, ozone, $N_2O$, NO, or the like. $O_2$ may be in the form of air (21 vol. % $O_2$) or may be provided at a concentration different from air.

Although many values of sintering parameters are described, after reading this specification, skilled artisans will appreciate that values outside those disclosed may be used without deviating from the concepts herein. The operations described above may be performed during a single heating cycle or during different heating cycles. Additional operations may be performed during heating. For example, during cooling after sintering, the sintered ceramic component may be allowed to soak at a temperature to reduce the likelihood of building up too much strain within the component. Controlling the heating rate and cooling rate may also be used to reduce the likelihood of building up too much strain and cracking within the component.

The sintered ceramic component is well suited for use as a gas manifold or another component used in conjunction with a solid oxide fuel cell, a gas-to-liquid membrane system, or for another application where the sintered ceramic component configured such that it withstand exposure to a relatively high (i.e., greater than 400° C.) during normal operating conditions of an apparatus.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below.

Embodiment 1. A sintered ceramic component having a final composition can include at least 50 wt. % MgO; at least one desired dopant, wherein each dopant of the at least one desired dopant has a desired dopant content of at least 0.1 wt. %; all impurities are present at a combined impurity content of less than 0.7 wt. %; and a remainder including $Al_2O_3$.

Embodiment 2. A process of forming a sintered ceramic component can include:
 combining a binder and at least one powder to form a green mixture, wherein the at least one powder includes at least 50 wt. % MgO; at least one desired dopant, wherein each dopant of the at least one desired dopant has a desired dopant content of at least 0.1 wt. %; all impurities are present at a combined impurity content of less than 0.7 wt. %; and a remainder including $Al_2O_3$;
 shaping the green mixture to form an object having a shape corresponding to the sintered ceramic component; and
 sintering the object to form the sintered ceramic component having a final composition, wherein sintering is performed at a temperature less than 1600° C., and the sintered ceramic component has a density that is at least 90% of theoretical density.

Embodiment 3. The process of Embodiment 2, further including combining a first powder including MgO, a second powder including $Al_2O_3$, and a third powder including the at least one desired dopant before adding the binder.

Embodiment 4. The process of Embodiment 2, further including combining a first powder including MgO and $Al_2O_3$ and a second powder including the at least one desired dopant before adding the binder.

Embodiment 5. The process of Embodiment 4, wherein the first powder includes a fused MgO-containing $MgAl_2O_4$ material.

Embodiment 6. The process of any one of Embodiments 2 to 5, wherein sintering is performed at a temperature of at least 1200° C., at least 1250° C., or at least 1300° C.

Embodiment 7. The process of any one of Embodiments 2 to 6, wherein sintering is performed at a temperature no greater than 1575° C., no greater than 1500° C., or no greater than 1450° C.

Embodiment 8. The process of any one of Embodiments 2 to 7, wherein sintering is performed at a temperature in a range of 1200° C. to 1575° C., 1250° C. to 1550° C., or 1300° C. to 1450° C.

Embodiment 9. The process of any one of Embodiments 2 to 8, further including burning out the binder before sintering the object.

Embodiment 10. The process of any one of Embodiments 2 to 9, wherein the at least one desired dopant within the combined powders is $CaCO_3$.

Embodiment 11. The sintered ceramic component or the process of any one of the preceding Embodiments, wherein the desired dopant content is at least 0.2 wt. %, at least 0.3 wt. %, at least 0.4 wt. %, or at least 0.5 wt. %.

Embodiment 12. The sintered ceramic component or the process of any one of the preceding Embodiments, wherein the desired dopant content is no greater than 5 wt. %, no greater than 3 wt. %, no greater than 2 wt. %, or no greater than 1.1 wt. %.

Embodiment 13. The sintered ceramic component or the process of any one of the preceding Embodiments, wherein the desired dopant content is in a range of 0.2 wt. % to 5 wt. %, 0.3 wt. % to 3 wt. %, 0.4 wt. % to 2 wt. %, or 0.5 wt. % to 1.1 wt. %.

Embodiment 14. The sintered ceramic component or the process of any one of the preceding Embodiments, wherein the at least one desired dopant includes CaO.

Embodiment 15. The sintered ceramic component or the process of Embodiment 14, wherein the CaO content is at least 0.2 wt. %, at least 0.3 wt. %, at least 0.4 wt. %, or at least 0.5 wt. %.

Embodiment 16. The sintered ceramic component or the process of Embodiment 14 or 15, wherein the CaO content is no greater than 3 wt. %, no greater than 2 wt. %, no greater than 1.5 wt. %, or no greater than 0.95 wt. %.

Embodiment 17. The sintered ceramic component or the process of Embodiments 14, 15, or 16, wherein the CaO content is in a range of 0.2 wt. % to 3 wt. %, 0.3 wt. % to 2 wt. %, 0.4 wt. % to 1.5 wt. %, 0.5 wt. % to 0.95 wt. %, or 0.2 wt. % to 0.5 wt. %.

Embodiment 18. The sintered ceramic component or the process of any one of the preceding Embodiments, wherein the at least one desired dopant includes $Y_2O_3$.

Embodiment 19. The sintered ceramic component of Embodiment 18, wherein the $Y_2O_3$ content is at least 0.2 wt. %, at least 0.3 wt. %, at least 0.4 wt. %, or at least 0.5 wt. %.

Embodiment 20. The sintered ceramic component of Embodiment 18 or 19, wherein the $Y_2O_3$ content is no greater than 3 wt. %, no greater than 2 wt. %, no greater than 1.5 wt. %, or no greater than 0.95 wt. %.

Embodiment 21. The sintered ceramic component of Embodiments 18, 19, or 20, wherein the $Y_2O_3$ content is in a range of 0.2 wt. % to 3 wt. %, 0.3 wt. % to 2 wt. %, 0.4 wt. % to 1.5 wt. %, or 0.5 wt. % to 0.95 wt. %.

Embodiment 22. The sintered ceramic component or the process of any one of the preceding Embodiments, wherein the at least one desired dopant includes $TiO_2$.

Embodiment 23. The sintered ceramic component of Embodiment 22, wherein the $TiO_2$ content is at least 0.2 wt. %, at least 0.3 wt. %, at least 0.4 wt. %, or at least 0.5 wt. %.

Embodiment 24. The sintered ceramic component of Embodiment 22 or 23, wherein the $TiO_2$ content is no greater than 3 wt. %, no greater than 2.5 wt. %, no greater than 2.0 wt. %, or no greater than 1.5 wt. %.

Embodiment 25. The sintered ceramic component of Embodiments 22, 23, or 24, wherein the $TiO_2$ content is in a range of 0.2 wt. % to 3 wt. %, 0.3 wt. % to 2.5 wt. %, 0.4 wt. % to 2.0 wt. %, or 0.5 wt. % to 1.5 wt. %.

Embodiment 26. The sintered ceramic component or the process of any one of the preceding Embodiments, wherein the at least one desired dopant includes SrO, BaO, $Sc_2O_3$, $La_2O_3$, $ZrO_2$, $HfO_2$, $V_2O_5$, $Nb_2O_5$, $Ta_2O_5$, $Mo_2O_3$, $W_2O_3$, $Co_2O_3$, or any combination thereof.

Embodiment 27. The sintered ceramic component or the process of any one of the preceding Embodiments, wherein the at least one desired dopant does not include $Cr_2O_3$, NiO, or CuO.

Embodiment 28. The sintered ceramic component or the process of any one of the preceding Embodiments, wherein the at least one dopant includes a first dopant and a second dopant.

Embodiment 29. The sintered ceramic component or the process of Embodiment 28, wherein the first dopant includes CaO, $Y_2O_3$, or $TiO_2$.

Embodiment 30. The sintered ceramic component or the process of Embodiment 28 or 29, wherein the second dopant includes CaO, $Y_2O_3$, $TiO_2$, $Fe_2O_3$, SrO, BaO, $Sc_2O_3$, $La_2O_3$, $ZrO_2$, $HfO_2$, $V_2O_5$, $Nb_2O_5$, $Ta_2O_5$, $Mo_2O_3$, $W_2O_3$, or $Co_2O_3$.

Embodiment 31. The sintered ceramic component or the process of any one of Embodiments 28 to 30, wherein the first dopant is present in the final composition at a higher concentration than the second dopant.

Embodiment 32. The sintered ceramic component or the process of any one of Embodiments 28 to 31, wherein the first dopant is present in the final composition at a lower concentration than the second dopant.

Embodiment 33. The sintered ceramic component or the process of any one of Embodiments 28 to 32, wherein a combination of the first and second dopants are in a range of 1 wt. % to 9 wt. % of the final composition.

Embodiment 34. The sintered ceramic component or the process of any one of the preceding Embodiments, wherein MgO has a content that is at least 51 wt. %, at least 55 wt. %, or at least 60 wt. %.

Embodiment 35. The sintered ceramic component or the process of any one of the preceding Embodiments, wherein MgO has a content that is no greater than 80 wt. %, no greater than 75 wt. %, or no greater than 70 wt. %.

Embodiment 36. The sintered ceramic component or the process of any one of the preceding Embodiments, wherein MgO has a content that is in a range of 51 wt. % to 80 wt. %, 55 wt. % to 75 wt. %, 60 wt. % to 70 wt. %.

Embodiment 37. The sintered ceramic component or the process of any one of the preceding Embodiments, wherein $Al_2O_3$ has a content that is at least 20 wt. %, at least 25 wt. %, or at least 30 wt. %.

Embodiment 38. The sintered ceramic component or the process of any one of the preceding Embodiments, wherein $Al_2O_3$ has a content that is no greater than 49 wt. %, no greater than 45 wt. %, or no greater than 40 wt. %.

Embodiment 39. The sintered ceramic component or the process of any one of the preceding Embodiments, wherein $Al_2O_3$ has a content that is in a range of 20 wt. % to 49 wt. %, 25 wt. % to 45 wt. %, 30 wt. % to 40 wt. %.

Embodiment 40. The sintered ceramic component or the process of any one of the preceding Embodiment, wherein the sintered ceramic component is a gas manifold.

Embodiment 41. An apparatus including the gas manifold of Embodiment 38, wherein the apparatus is a solid oxide fuel cell, and the gas manifold is fluidly coupled to an electrode of the solid oxide fuel cell.

Embodiment 42. The sintered ceramic component or the process of any one of the Embodiments 1 to 39, wherein the sintered ceramic component is a component of a gas-to-liquid membrane system.

Embodiment 43. The sintered ceramic component or the process of any one of preceding Embodiments, wherein the sintered ceramic component has the following CIELAB coordinates:
L* is at least 65, at least 80, or at least 88;
a* is in a range of −1.0 to +7.0, −0.3 to +2.0, or −0.2 to +1.5; and
b* is in a range of +4.0 to +20, +4.2 to +15, or +4.4 to +12.

Embodiment 44. The sintered ceramic component or the process of any one of the preceding Embodiments, wherein the sintered ceramic component has the following CIELAB coordinates:
L* is at least 85, at least 88, or at least 89;
a* is in a range of −1.0 to +1.0, −0.3 to +0.7, or −0.2 to +0.4; and
b* is in a range of +4.0 to +9.0 +4.2 to +8.5, or +4.4 to +8.0.

Embodiment 45. The sintered ceramic component or the process of any one of Embodiments 1 to 43, wherein the sintered ceramic component has the following CIELAB coordinates:
L* is at least 65, at least 70, or at least 75;
a* is in a range of 0.0 to +7.0 +0.5 to +6.6 or +0.7 to +6.0; and
b* is in a range of +5.0 to +20, +6.0 to +17, or +6.5 to +15.

Embodiment 46. The sintered ceramic component or the process of any of the preceding Embodiments, wherein the sintered ceramic component has a density that is at least 3%, at least 6%, at least 9%, or at least 12% higher than a different sintered ceramic component that includes at least 50 wt. % MgO, all impurities are present at a combined impurity content of less than 0.7 wt. %, a reminder including $Al_2O_3$, and other than MgO and $Al_2O_3$, no other metal oxide is present at a content of at least 0.1 wt. %.

Embodiment 47. The sintered ceramic component or the process of any of the preceding Embodiments, wherein the sintered ceramic component has a density that is no greater that 17%, no greater than 16%, no greater than 15%, or no greater than 14% higher than a different sintered ceramic component that includes at least 50 wt. % MgO, all impurities are present at a combined impurity content of less than 0.7 wt. %, a remainder including $Al_2O_3$, and other than MgO and $Al_2O_3$, no other metal oxide is present at a content of at least 0.1 wt. %.

Embodiment 48. The sintered ceramic component or the process of any of the preceding Embodiments, wherein the sintered ceramic component has a density that is in a range of 3% to 17%, 6% to 16%, 9% to 15% higher than a different sintered ceramic component that includes at least 50 wt. % MgO, all impurities are present at a combined impurity content of less than 0.7 wt. %, a remainder including $Al_2O_3$, and, other than MgO and $Al_2O_3$, no other metal oxide is present at a content of at least 0.1 wt. %.

Embodiment 49. The sintered ceramic component or the process of any of the preceding Embodiments, wherein the sintered ceramic component has a coefficient of thermal expansion from 25° C. to 1200° C. of at least 9.0 ppm/° C., at least 10.3 ppm/° C., or at least 10.6 ppm/° C.

Embodiment 50. The sintered ceramic component or the process of any of the preceding Embodiments, wherein the sintered ceramic component has a coefficient of thermal expansion from 25° C. to 1200° C. of no greater than 13.0 ppm/° C., no greater than 12.7 ppm/° C., or no greater than 12.5 ppm/° C.

Embodiment 51. The sintered ceramic component or the process of any of the preceding Embodiments, wherein the sintered ceramic component has a coefficient of thermal expansion from 25° C. to 1200° C. in a range of 9.0 ppm/° C. to 13.0 ppm/° C., 10.3 ppm/° C. to 12.7 ppm/° C., or 10.6 ppm/° C. to 12.5 ppm/° C.

EXAMPLES

The examples presented below demonstrate that sintered ceramic components having compositions as described above may be formed at sintering temperatures that are less than 1600° C. and achieve desired densities and visible appearances. The sintered ceramic components may have different colors depending on the dopants and dopant concentrations selected. Samples were generated for analysis of sintering temperatures, densities when sintered at 1550° C. for 4 hours, and color information of the sintered materials.

1. Composition of Samples and Annealing

Samples were generated with different compositions. One sample was made using conventional commercial-grade starting materials that were relatively high in impurities and is referred to as the Impure Sample. Samples were made with starting materials that had relatively low impurity levels and are referred to the Pure 1 Sample and the Pure 2 Sample. Tables 1 and 2 below include particle size distributions and the compositions of the Impure and Pure 1 and 2 Samples. For particle size distributions, $d_{10}$, $d_{50}$, and $d_{90}$ represent the $10^{th}$ percentile, $50^{th}$ percentile, and the $90^{th}$ percentile of the Impure and Pure Samples.

TABLE 1

Particle Size Distribution of the Impure and Pure Samples

| Sample | $d_{10}$ (mm) | $d_{50}$ (mm) | $d_{90}$ (mm) |
|---|---|---|---|
| Impure Sample | 0.13 | 2.65 | 5.25 |
| Pure 1 Sample | 0.46 | 2.82 | 4.98 |
| Pure 2 Sample | 0.22 | 2.81 | 6.91 |

TABLE 2

Composition of Impure and Pure Samples

| Sample | MgO wt. % | $Al_2O_3$ wt. % | CaO ppm | $Y_2O_3$ ppm | $TiO_2$ ppm | $ZrO_2{}^a$ ppm | $SiO_2$ ppm | $Na_2O$ ppm |
|---|---|---|---|---|---|---|---|---|
| Impure | 64.6 | 35.1 | 6100 | 160 | 124 | 1600 | 1100 | 600 |
| Pure 1 | 65.2 | 34.6 | 645 | <5 | 10 | 150 | 120 | 140 |
| Pure 2 | 66.4 | 35.0 | 765 | 20 | 60 | 2600 | 190 | 65 |

$^a ZrO_2$ reported is the combination of $ZrO_2$ and $HfO_2$

Other samples were generated using the starting materials with the relatively low impurity levels and had dopants at different concentrations added to such starting materials. In particular, doped samples below were generated using the material used to form the Pure 1 Sample, except for samples doped or co-doped with $TiO_2$ and the Y1-Ca0.5 Sample, each of which were generated using the material used to form the Pure 2 Sample. Below are tables with samples and the doping concentrations.

TABLE 3

CaO-doped Samples (Doped from material used for Pure 1 Sample)

| Sample | CaO vol. % | CaO wt. % |
|---|---|---|
| CaO 0.14 | 0.14 | 0.130 |
| CaO 0.25 | 0.25 | 0.235 |
| CaO 0.28 | 0.28 | 0.262 |
| CaO 0.42 | 0.42 | 0.393 |
| CaO 0.50 | 0.50 | 0.469 |
| CaO 0.56 | 0.56 | 0.524 |
| CaO 0.75 | 0.75 | 0.704 |
| CaO 1.00 | 1.00 | 0.939 |

TABLE 4

$Y_2O_3$-doped Samples (Doped from material used for Pure 1 Sample)

| Sample | $Y_2O_3$ vol. % | $Y_2O_3$ wt. % |
|---|---|---|
| $Y_2O_3$ 1% | 1 | 1.398 |
| $Y_2O_3$ 2% | 2 | 2.784 |
| $Y_2O_3$ 3% | 3 | 4.160 |
| $Y_2O_3$ 4% | 4 | 5.524 |

TABLE 5

$TiO_2$-doped Samples (Doped from material used for Pure 2 Sample)

| Sample | $TiO_2$ vol. % | $TiO_2$ wt. % |
|---|---|---|
| $TiO_2$ 0.25 | 0.25 | 0.296 |
| $TiO_2$ 0.50 | 0.50 | 0.592 |
| $TiO_2$ 0.75 | 0.75 | 0.887 |
| $TiO_2$ 1.00 | 1.00 | 1.183 |

TABLE 6

Co-Doped Samples

| Sample | $Y_2O_3$ or $TiO_2$ vol. % | $Y_2O_3$ or $TiO_2$ wt. % | CaO vol. % | CaO wt. % |
|---|---|---|---|---|
| Y1—Ca0.5 | 1.00 | 1.398 | 0.5 | 0.467 |
| Y2.22—Ca0.84 | 2.22 | 3.083 | 0.84 | 0.779 |
| Ti0.5—Ca0.5 | 0.50 | 0.592 | 0.50 | 0.469 |
| Ti1—Ca0.5 | 1.00 | 1.183 | 0.50 | 0.469 |

After preparing the samples, samples were heated to 1600° C. at a rate of 10° C./minute to obtain data for dilatometry curves. Other samples were heated to 1550° C. for 4 hours in air to obtain densification data.

2. Experimental Data

Figure 2:
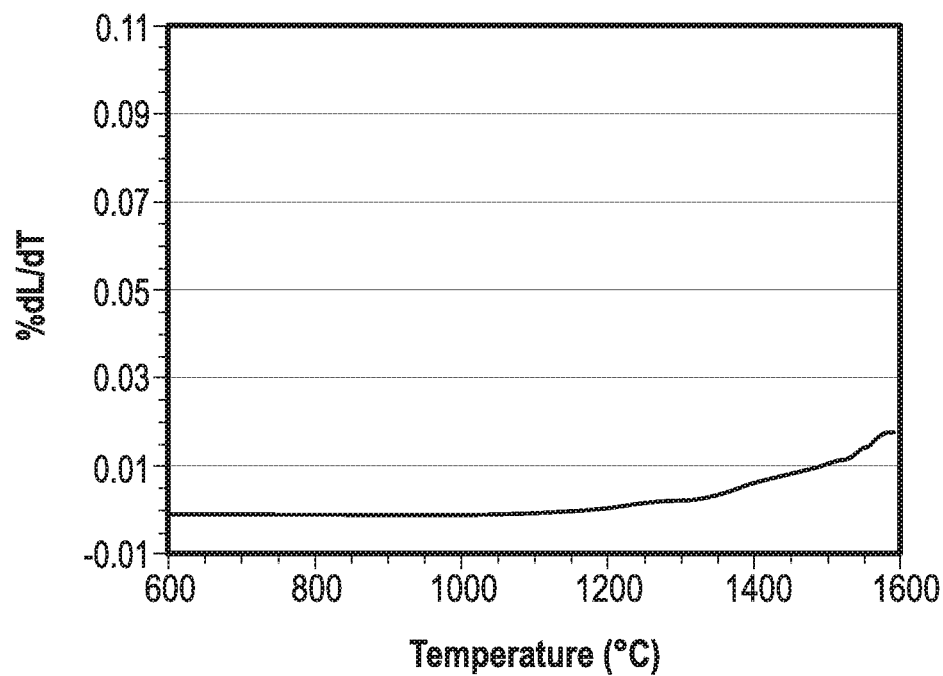
FIG. 2 includes a dilatometry curve for a comparative sample with a relatively low level of impurities.
Figure 3:
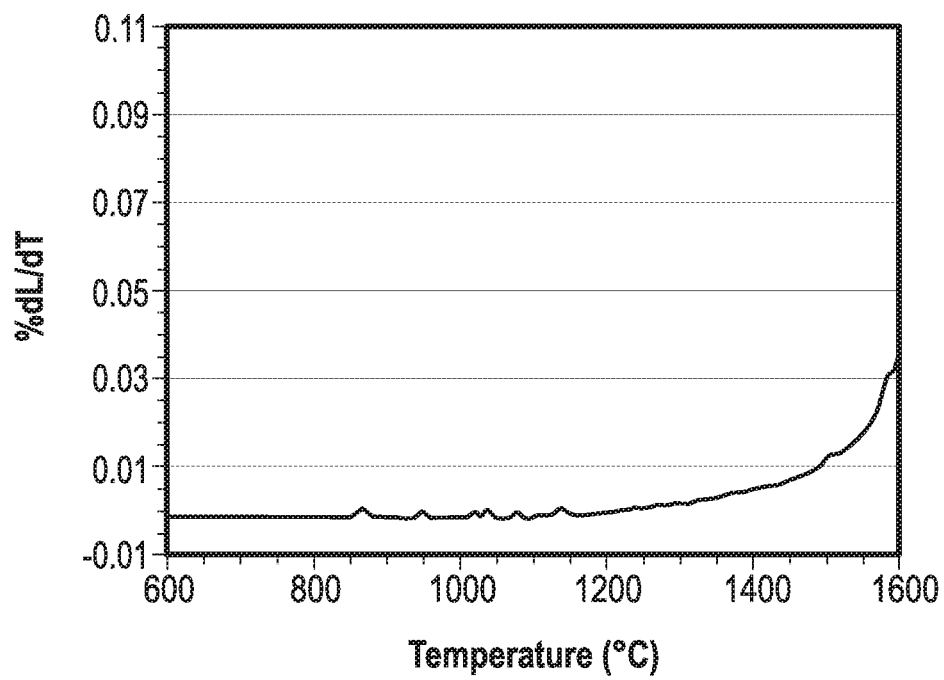
FIG. 3 includes a dilatometry curve for another comparative sample with a relatively low level of impurities.
Figure 4:
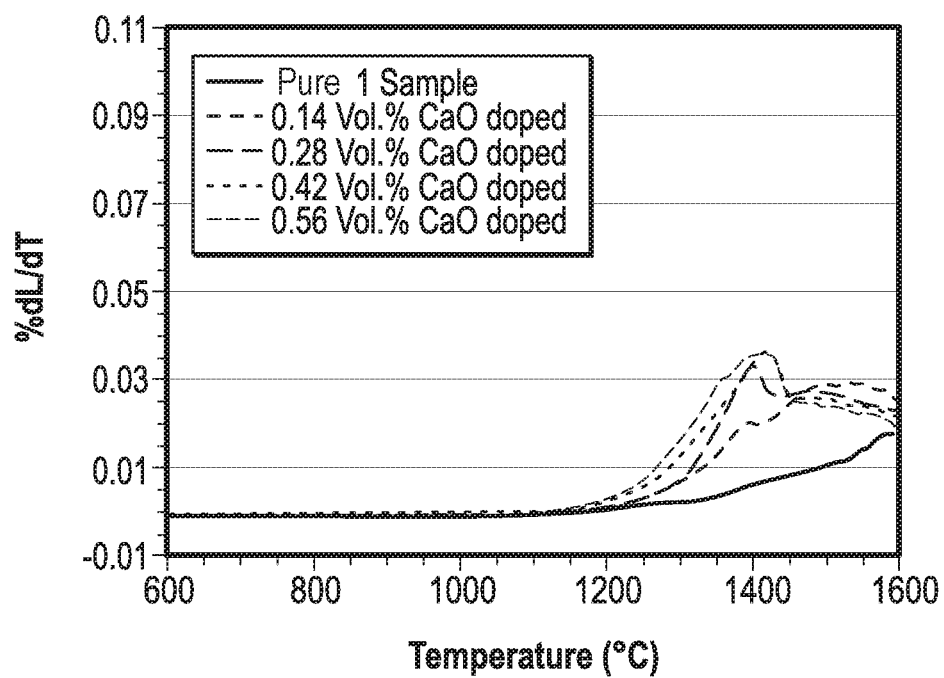
FIG. 4 includes a dilatometry curve for a CaO-doped sample formed using material having a relatively low level of impurities.
Figure 5:
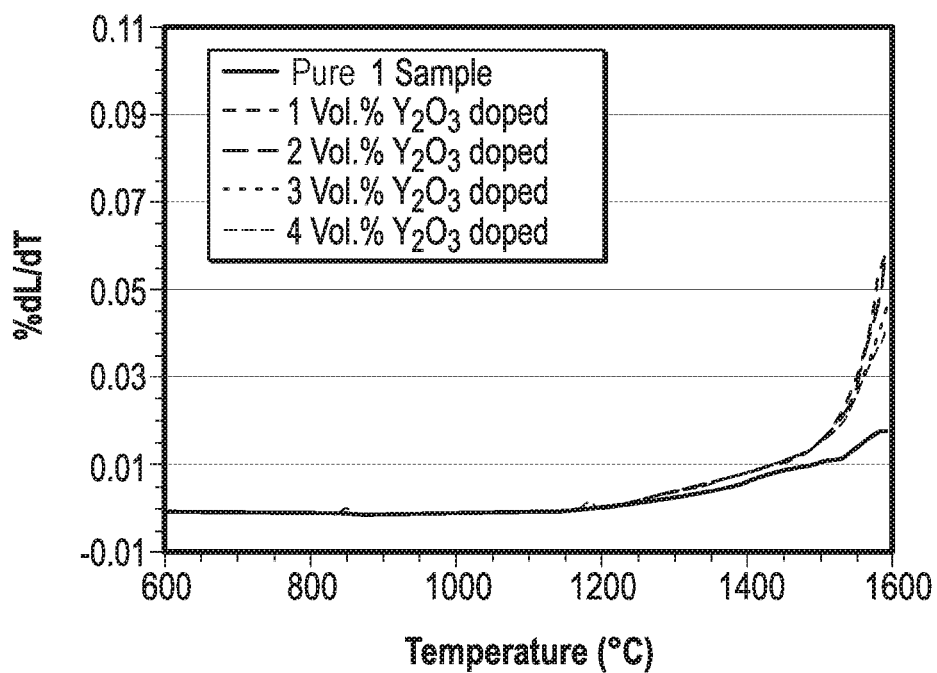
FIG. 5 includes a dilatometry curve for a $Y_2O_3$-doped sample formed using material having a relatively low level of impurities.
Figure 6:
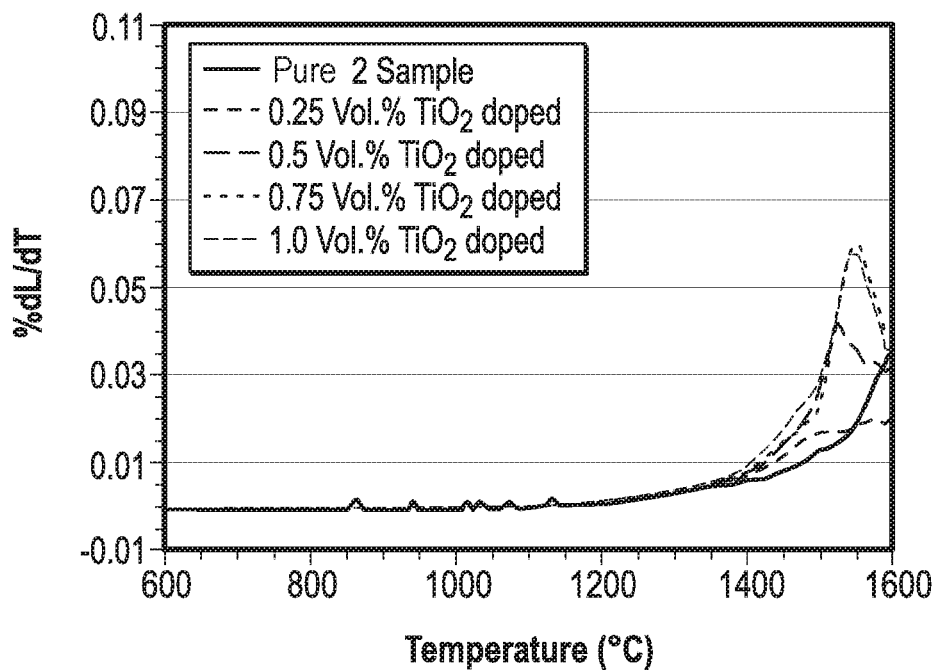
FIG. 6 includes a dilatometry curve for a $TiO_2$-doped sample formed using material having a relatively low level of impurities.
Figure 7:
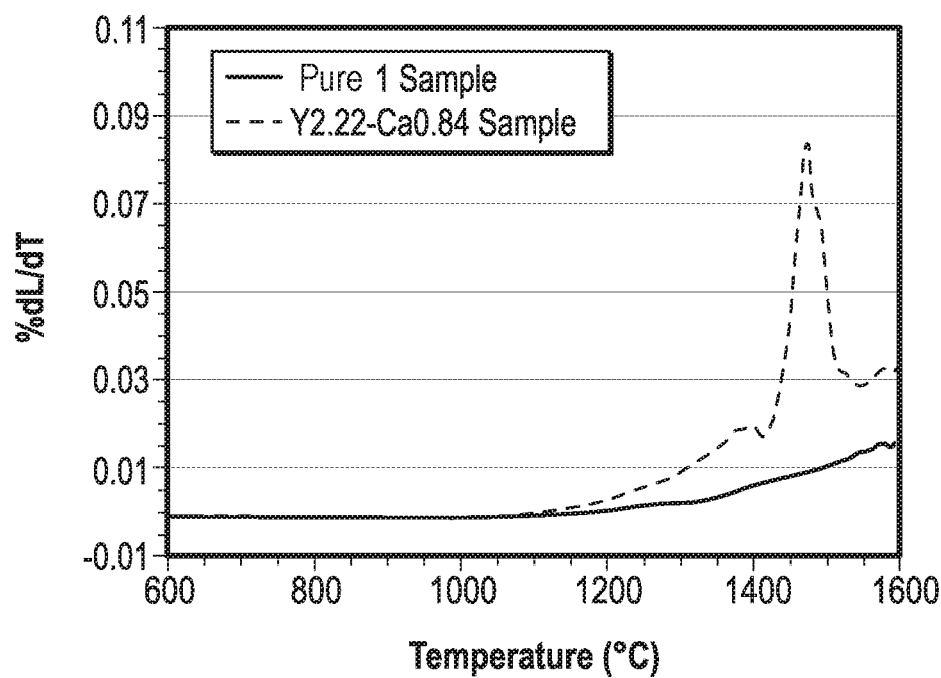
FIG. 7 includes a dilatometry curve for a co-doped sample formed using material having a relatively low level of impurities.
Figure 8:
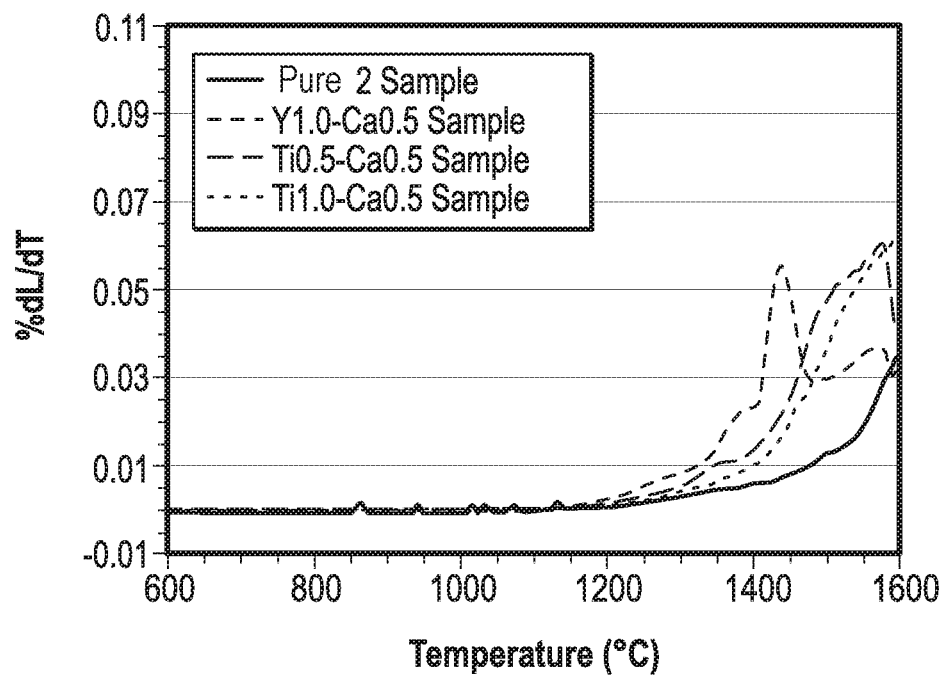
FIG. 8 includes a dilatometry curve for co-doped samples formed using material having a relatively low level of impurities.

Dilatometry curves were generated for the samples and are included in FIGS. 1 to 8, which have % dL/dT as a function of temperature during the heating to 1600° C. FIG. 1 includes a dilatometry curve of the Impure Sample. FIGS. 2 and 3 include dilatometry curves of the Pure 1 and Pure 2 Samples. FIGS. 4 to 8 include the dilatometry curves for selected doped and co-doped samples.

Figure 9:
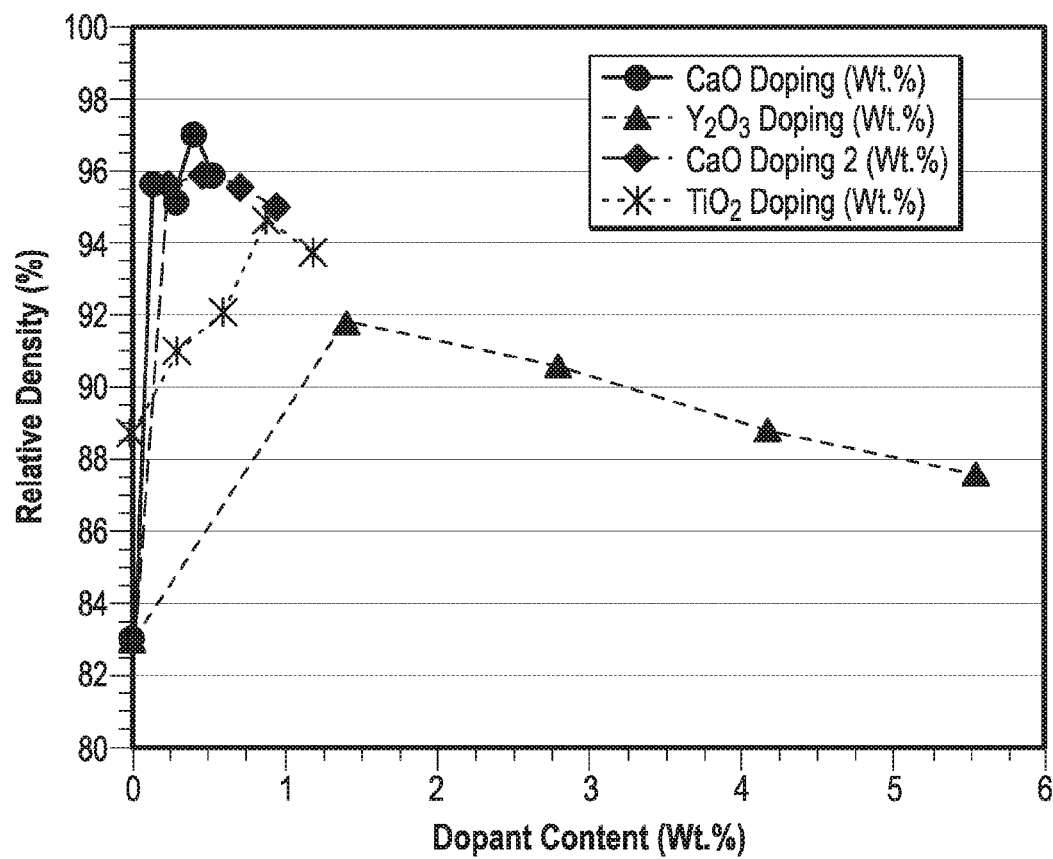
FIG. 9 includes a plot of relative density as a function of dopant content for different dopants.

Densification was performed at 1550° C. for 4 hours in air except as explicitly noted. FIG. 9 includes a plot of densification, expressed as percentage of theoretical density as a function of doping concentration for particular dopants. The material for the Impure Sample has typically has a densification in a range of 95.7% to 98.8%. Table 7 includes the densification data.

TABLE 7

Densification (1550° C. for 4 hours in air)

| Sample | Relative Density (% of Theoretical Density) |
|---|---|
| Impure | 95.7 to 98.8 |
| Pure 1 | 83.0 |
| Pure 2 | 88.7 |
| CaO 0.14 | 95.6 |
| CaO 0.25 | 95.6 |
| CaO 0.28 | 95.2 |
| CaO 0.42 | 97.0 |
| CaO 0.5 | 95.6 |
| CaO 0.56 | 95.6 |
| CaO 0.75 | 95.5 |
| CaO 1.0 | 95.0 |
| $Y_2O_3$ 1% | 91.8 |
| $Y_2O_3$ 2% | 90.6 |
| $Y_2O_3$ 3% | 88.8 |
| $Y_2O_3$ 4% | 87.6 |
| $TiO_2$ 0.25 | 91.0 |
| $TiO_2$ 0.50 | 92.1 |
| $TiO_2$ 0.75 | 94.7 |
| $TiO_2$ 1.00 | 93.7 |
| Y2.2—Ca0.84 | 97.4 |
| Y1.0—Ca0.5 | 95.1 |
| Ti0.5—Ca0.5 | 95.4 |
| Ti1.0—Ca0.5 | 96.2 |

Samples were checked for their visible appearance to the human eye. Samples were inspected after densification, and after annealing the densified samples were annealed at 800° C. for 72 hours in air. Table 8 includes the visual appearance information.

TABLE 8

Visual Appearance

| Sample | Appearance after densification | Appearance after densification and further anneal |
|---|---|---|
| Impure | | |
| Pure 1 | White | White |
| Pure 2 | White | White |
| CaO | White | White |
| $Y_2O_3$ | Dark Yellow | Light Yellow |
| $TiO_2$ | White | White |
| CaO and $Y_2O_3$ | Dark Yellow | Darker Yellow (Brown) |
| CaO and $TiO_2$ | White | White |

Samples after densification were analyzed for their color in terms of color space coordinates L*, a* and b*. YI E313 [D65/10] is yellowness as measured using ASTM standard E313 using the version in effect as of the filing date of this specification. D65 is the standard illuminant, and 10 refers to the angle of insert light. Table 9 includes color space coordinate and yellowness information.

TABLE 9

Color Space Coordinates and Yellowness

| Sample | L* | a* | b* | YI E313 [D65/10] |
|---|---|---|---|---|
| Impure | 78.21 | 3.05 | 18.85 | 40.95 |
| Pure 1 | 96.77 | 0.46 | 3.86 | 7.53 |
| Pure 2 | 96.41 | 0.38 | 4.22 | 8.16 |
| CaO 0.14 | 92.46 | 0.19 | 4.89 | 9.56 |
| CaO 0.25 | 90.05 | 0.1 | 5.62 | 11.10 |
| CaO 0.28 | 91.3 | 0.06 | 5.65 | 10.98 |
| CaO 0.42 | 89.47 | 0.11 | 6.91 | 13.61 |
| CaO 0.5 | 89.3 | 0.05 | 5.68 | 11.24 |
| CaO 0.56 | 90.16 | −0.16 | 5.64 | 10.90 |
| CaO 0.75 | 90.28 | −0.05 | 6.45 | 12.51 |
| CaO 1.0 | 90.02 | −0.03 | 7.73 | 14.95 |
| $Y_2O_3$ 1 | 84.66 | 3.49 | 12.58 | 27.91 |
| $Y_2O_3$ 2 | 75.46 | 4.32 | 14.72 | 35.50 |
| $Y_2O_3$ 3 | 70.7 | 5.69 | 13.92 | 37.06 |
| $Y_2O_3$ 4 | 65.53 | 6.55 | 11.47 | 34.81 |
| $TiO_2$ 0.25 | 96.12 | 0.32 | 4.74 | 9.08 |
| $TiO_2$ 0.50 | 95.33 | 0.32 | 5.71 | 10.90 |
| $TiO_2$ 0.75 | 93.87 | −0.01 | 6.11 | 11.52 |
| $TiO_2$ 1.00 | 92.69 | −0.06 | 6.23 | 11.83 |
| Y2.2—Ca0.84 | 78.81 | 5.95 | 18.03 | 41.95 |
| Y1.0—Ca0.5 | 92.43 | 0.20 | 5.03 | 9.82 |
| Ti0.5—Ca0.5 | 90.72 | −0.98 | 10.65 | 19.39 |
| Ti1.0—Ca0.5 | 90.41 | −0.66 | 11.97 | 22.06 |

3. Observations

The Impure Sample has good sintering and densification properties; however, the Impure Sample has a high level of impurities due to commercial-grade starting materials being used. The Pure 1 Sample has a white appearance, but the density is 83% when exposed to 1550° C. for 4 hours. In some applications, a densification of at least 95% may be needed or desired. Thus, sintering would need to be performed at a temperature greater than 1600° C. or the exposure at 1600° C. or lower would be long, both of which are undesired. The Pure 1 and 2 Samples have very low levels of impurities and have a white appearance. As compared to Pure 1 Sample, the Pure 2 Sample has a significantly higher $ZrO_2$ content; however, even at such a $ZrO_2$ content, the Pure 2 Sample still does not have sufficiently good sintering and density properties.

The CaO-doped samples have a white appearance and good sintering characteristics. After sintering at 1550° C. for 4 hours in air, the density is over 95% of theoretical density at a CaO content of 0.13 wt. % and higher. Overall, the density is the highest in a range of 0.40 wt. % to 0.55 wt. % CaO content. Higher CaO can be used; however, the higher content levels increase manufacturing costs and does not further improve density.

The $Y_2O_3$ 1 sample has a white appearance. As the $Y_2O_3$ content increases the sample becomes more yellow. At 2 vol. % and higher, the $Y_2O_3$-doped samples have a dark yellow appearance that can change to yellow when exposed at 800° C. for 72 hours in air. The sintering characteristics are good, but not as good as the CaO-doped samples. Based on the data, the density increases until the $Y_2O_3$ content reaches 1.40 wt. % and then decreases.

The $TiO_2$-doped samples have a white appearance. The sintering characteristics are good, and between the sintering characteristics of the CaO-doped samples and the $Y_2O_3$-doped samples. Based on the data, the density increases until the $TiO_2$ content reaches 0.9 wt. % and then decreases.

Y1.0-Ca0.5-co-doped samples have a white appearance and with a density of 95.1%, the same as CaO 0.5 singly doped samples both in density and in appearance while higher than Y 1.0 (1.0 Vol %.$Y_2O_3$) singly doped samples (91.8%). The Y2.2-Ca0.84 has a higher density (97.4%) than the density of Y or Ca samples, regardless of Y or Ca content in their corresponding singly doped samples, and the Y2.2-Ca0.84 co-doped samples have dark yellow appearance, the same as $Y_2O_3$ doped samples with a $Y_2O_3$ content of 2.78 wt % and higher. The data indicates that a certain amount of $Y_2O_3$ and CaO doping can be used if both color and density are important in some applications. Both Ti0.5-Ca0.5 and Ti1.0-Ca0.5 co-doped samples have similar results in the both density and appearance as the CaO 0.5 singly doped samples but higher than Ti 0.5 and Ti 1.0 singly doped samples for the density.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A sintered ceramic component, comprising:
   at least 50 wt. % MgO;
   at least one dopant including CaO, $TiO_2$, or a combination thereof, wherein each dopant of the at least one dopant has a dopant content of at least 0.1 wt. %, and
   all impurities are present at a combined impurity content of less than 0.7 wt. %,
   wherein the sintered ceramic component comprises $MgAl_2O_4$ and has a density that is at least 90% of theoretical density; and
   wherein when the sintered ceramic component comprises $SiO_2$, the $SiO_2$ is one of the impurities.

2. The sintered ceramic component of claim 1, wherein the density is at least 94% of the theoretical density.

3. The sintered ceramic component of claim 1, wherein MgO is in a content from 50 wt. % to 80 wt. %.

4. The sintered ceramic component of claim 1, wherein the dopant content is in a range of 0.2 wt. % to 5 wt. %.

5. The sintered ceramic component of claim 1, wherein the at least one dopant includes CaO.

6. The sintered ceramic component of claim 5, wherein CaO is in a content of at least 0.2 wt. %.

7. The sintered ceramic component of claim 1, wherein the at least one dopant includes $TiO_2$.

8. The sintered ceramic component of claim 7, wherein $TiO_2$ is in a content of no greater than 3 wt. %.

9. The sintered ceramic component of claim 1, wherein the at least one dopant consists essentially of CaO, $TiO_2$, or a combination thereof.

10. A sintered ceramic gas manifold, comprising;
    at least 50 wt. % MgO;
    at least one dopant including CaO, $TiO_2$, or a combination thereof, wherein each dopant of the at least one dopant has a dopant content of at least 0.1 wt. %, and
    all impurities are present at a combined impurity content of less than 0.7 wt. %,
    wherein the sintered ceramic component comprises $MgAl_2O_4$ and has a density that is at least 90% of theoretical density.

11. The sintered ceramic component of claim 1, wherein the sintered ceramic component is a component of a gas-to-liquid membrane system.

12. The sintered ceramic component of claim 1, wherein the sintered ceramic component has a coefficient of thermal expansion from 25° C. to 1200° C. in a range of 9.0 ppm/° C. to 13.0 ppm/° C.

13. A process of forming a sintered ceramic component including $MgAl_2O_4$ comprising:
    combining a binder and at least one powder to form a green mixture, wherein the at least one powder includes:
       at least 50 wt. % MgO;
       at least one dopant material including CaO, $CaCO_3$, $TiO_2$, or a combination thereof, wherein each dopant material of the at least one desired dopant material has a desired content of at least 0.1 wt. %; and
       all impurities are present at a combined impurity content of less than 0.7 wt. %;
    shaping the green mixture to form an object having a shape corresponding to the sintered ceramic component; and
    sintering the object to form the sintered ceramic component including $MgAl_2O_4$ and having a density of at least 90% of theoretical density, wherein when the sintered ceramic component comprises $SiO_2$, the $SiO_2$ is one of the impurities.

14. The process of claim 13, wherein the at least one powder includes a material including $MgAl_2O_4$.

15. The process of claim 13, wherein the at least one powder includes MgO and spinel.

16. The process of claim 13, wherein the at least one powder includes $Al_2O_3$.

17. The process of claim 13, wherein the at least one dopant material includes CaO, $CaCO_3$, or a combination thereof.

18. The process of claim 13, wherein the at least one dopant material includes $Y_2O_3$.

19. The process of claim 13, wherein the at least one dopant material consists essentially of CaO, $CaCO_3$, $TiO_2$ or a combination thereof.

20. The process of claim 13, wherein sintering is performed at a temperature less than 1600° C.

* * * * *